United States Patent
Shiroya et al.

(10) Patent No.: US 12,535,106 B2
(45) Date of Patent: Jan. 27, 2026

(54) SLIDE MEMBER

(71) Applicant: DAIDO METAL COMPANY LTD., Nagoya (JP)

(72) Inventors: Tomoyasu Shiroya, Inuyama (JP); Akira Ando, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 381 days.

(21) Appl. No.: 18/153,393

(22) Filed: Jan. 12, 2023

(65) Prior Publication Data

US 2023/0228296 A1 Jul. 20, 2023

(30) Foreign Application Priority Data

Jan. 17, 2022 (JP) ................. 2022-005050

(51) Int. Cl.
*F16C 33/12* (2006.01)

(52) U.S. Cl.
CPC .......... *F16C 33/125* (2013.01); *F16C 33/124* (2013.01); *F16C 2204/36* (2013.01)

(58) Field of Classification Search
None
See application file for complete search history.

(56) References Cited

U.S. PATENT DOCUMENTS 10,982,712 B2 * 4/2021 Ichikawa ............... F16C 33/121
12,110,922 B2 * 10/2024 Verbickas ................ C25D 3/56

FOREIGN PATENT DOCUMENTS

| JP | 2006105265 A | * | 4/2006 | ............. F16C 33/12 |
|---|---|---|---|---|
| JP | 2019-100350 A | | 6/2019 | |
| JP | 2019-214771 A | | 12/2019 | |
| JP | 2020-46073 A | | 3/2020 | |
| JP | 2021-25067 A | | 2/2021 | |

OTHER PUBLICATIONS

Office Action dated Jan. 5, 2024 in counterpart foreign application, JP 2022-005050.

* cited by examiner

*Primary Examiner* — Daniel J. Schleis
(74) *Attorney, Agent, or Firm* — Harness, Dickey & Pierce, P.L.C.

(57) ABSTRACT

A sliding member includes a bearing alloy layer and an overlay. The overlay includes a diffusion prevention layer on the bearing alloy layer, and a corrosion prevention layer on the diffusion prevention layer. A surface of the corrosion prevention layer is a sliding surface. The corrosion prevention layer constitutes 50% to 90% of an entire volume of the overlay. The corrosion prevention layer and the diffusion prevention layer each include a corrosion inhibitor and the balance of Bi and inevitable impurities. The corrosion inhibitor is defined as one or more elements that have a higher oxygen affinity than Bi and that form an alloy, a solid solution or an intermetallic compound with Bi. An average concentration of the corrosion inhibitor included in the diffusion prevention layer is lower than an average concentration of the corrosion inhibitor included in the corrosion prevention layer.

12 Claims, 1 Drawing Sheet

SLIDE MEMBER

CROSS-REFERENCE TO RELATED APPLICATIONS

This application claims the benefit and priority of JP 2022-005050, filed Jan. 17, 2022. The entire disclosure of the above application is incorporated herein by reference.

TECHNICAL FIELD

The present invention relates to a sliding member, such as a bearing used in internal combustion engines or automatic transmissions or a bearing used in various machines. Specifically, the present invention relates to a sliding member including an overlay on a bearing alloy layer.

BACKGROUND OF THE INVENTION

Many sliding members such as bearings of internal combustion engines include a copper bearing alloy or an aluminum bearing alloy bonded to a steel back metal. A copper alloy or an aluminum alloy included in a sliding member allows the sliding member to have a strong surface that can withstand a load applied to the sliding member when the sliding member is in use. Such a sliding member needs to have not only good embedding properties and conformability but also appropriate seizure resistance. For this purpose, a soft overlay made of a material such as lead or a lead alloy has been typically provided on a surface of the bearing alloy. Lead has been known as a highly reliable coating material that has the above properties and also provides appropriate fatigue resistance to an external load. From a viewpoint of environmental pollution, however, a Bi alloy is often used as an overlay material in place of lead.

Due to recent environmental regulations, complexity of an engine mechanism and a fuel has been increasing, and various materials (e.g., EGR combustion gas condensed water, biofuel) are mixed in oil. Thus, even if Bi is used which is presumed to have higher corrosion resistance than Pb, corrosion (mainly oxidation) of an overlay often occurs.

For the purpose of providing a sliding member including an overlay having high fatigue resistance, JP 2019-214771A discloses an overlay composed of a Bi—Sb alloy plating coating at a Sb concentration, on a surface of the overlay, of not less than 0.92 mass % and not more than 13 mass %. However, Bi and Sb are simultaneously plated (i.e., alloy plating), the Sb component diffuses in the vicinity of an interface between the overlay and the bearing alloy layer, since it is compatible with a bearing alloy layer. Thus, the Sb concentration in the vicinity of a sliding surface of the overlay reduces, leading to corrosion. Therefore, no dramatic improvement in corrosion resistance is expected.

JP 2020-46073A discloses a sliding member which includes an overlay made of Bi and Sb located on a copper alloy via a Ag—Sn alloy intermediate layer. The Ag—Sn alloy intermediate layer prevents diffusion of Cu from the copper alloy to prevent formation of a brittle Sb—Cu compound, achieving high fatigue resistance. In JP 2020-46073A, the use of a Ag—Sn alloy intermediate layer at an interface between a Bi—Sb alloy plating layer and a substrate prevents a reduction in Sb concentration due to diffusion of Sb in the Bi—Sb alloy plating layer. However, the Ag—Sn alloy used in the intermediate layer has insufficient corrosion resistance and causes corrosion.

SUMMARY OF THE INVENTION

An object of the present invention is to solve the above problems of the conventional techniques and provide a sliding member including a Bi-based overlay having high corrosion resistance. In particular, the present invention provides a Bi-based overlay structure capable of maintaining the corrosion resistance when the sliding member is in use.

According to an aspect of the present invention, provided is a sliding member including a bearing alloy layer and an overlay on the bearing alloy layer. The overlay includes a diffusion prevention layer on the bearing alloy layer, and a corrosion prevention layer on the diffusion prevention layer. A surface of the corrosion prevention layer is a sliding surface. The corrosion prevention layer constitutes 50% to 90% of an entire volume of the overlay. The corrosion prevention layer and the diffusion prevention layer each include: a corrosion inhibitor; and the balance of Bi and inevitable impurities. The corrosion inhibitor is defined as one or more elements that have a higher oxygen affinity than Bi and that form an alloy, a solid solution or an intermetallic compound with Bi. An average concentration of the corrosion inhibitor in the diffusion prevention layer is lower than an average concentration of the corrosion inhibitor in the corrosion prevention layer.

According to an embodiment of the present invention, a difference between the average concentration of the corrosion inhibitor in the diffusion prevention layer and the average concentration of the corrosion inhibitor in the corrosion prevention layer is preferably not less than 1.0 mass %.

According to an embodiment of the present invention, the average concentration of the corrosion inhibitor in the corrosion prevention layer is preferably 3.0 mass % to 20.0 mass %.

According to an embodiment of the present invention, the average concentration of the corrosion inhibitor in the diffusion prevention layer is preferably 1.0 mass % to 8.0 mass %.

According to an embodiment of the present invention, the corrosion inhibitor is preferably at least one element selected from Sn, Cu, Zn, In, Sb, and Ag.

According to an embodiment of the present invention, the corrosion inhibitor is preferably a combination of Sb and at least one selected from Sn, Cu, Zn, In, and Ag.

According to an embodiment of the present invention, the corrosion inhibitor is preferably Sb.

According to an embodiment of the present invention, the overlay preferably further includes hard particles.

According to an embodiment of the present invention, the overlay preferably further includes a lubricant.

According to an embodiment of the present invention, preferably, the sliding member further includes a back-metal layer, and the bearing alloy layer is located on the back-metal layer.

According to an embodiment of the present invention, the sliding member is preferably a sliding bearing.

According to another aspect of the present invention, provided is a bearing device including the sliding member described above.

According to further another aspect of the present invention, provided is an internal combustion engine including the bearing device described above.

Embodiments of the present invention and advantages thereof will be described in detail below with reference to the accompanying drawings. The drawings illustrate non-limiting embodiments merely for example.

DESCRIPTION OF THE EMBODIMENTS

Figure 1:
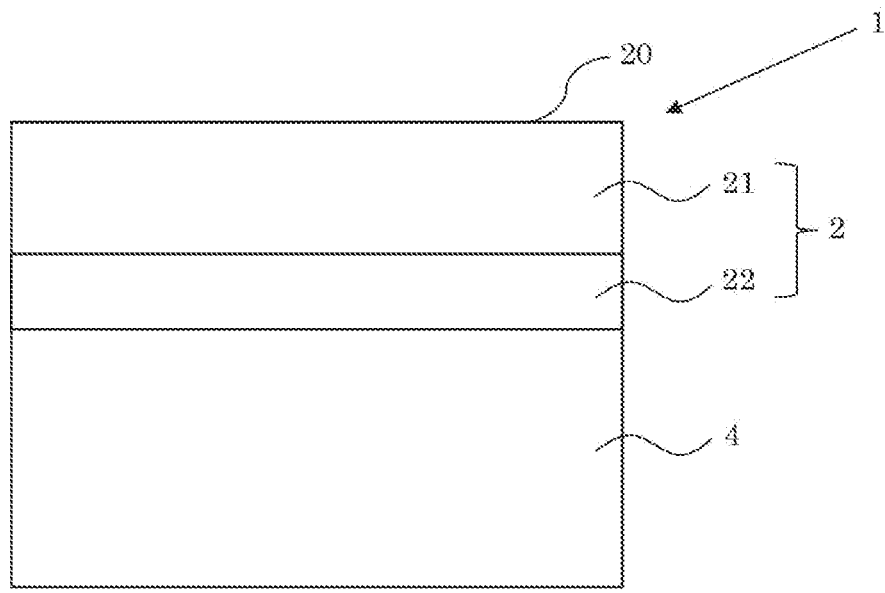
FIG. 1 is a schematic cross-sectional view of an embodiment of a sliding member according to the present invention.

FIG. 1 is a schematic cross-sectional view of an embodiment of a sliding member according to the present invention. In a sliding member 1, an overlay 2 including Bi as a main component is located on a bearing alloy layer 4. The overlay 2 includes a corrosion prevention layer 21 that defines a sliding surface 20, and a diffusion prevention layer 22 that is located between the bearing alloy layer 4 and the corrosion prevention layer 21. The corrosion prevention layer 21 includes a corrosion inhibitor. The corrosion inhibitor may be one or more elements that have a higher oxygen affinity than Bi and that form an alloy, a solid solution or an intermetallic compound with Bi. The diffusion prevention layer 22 also includes a corrosion inhibitor. An average concentration of the corrosion inhibitor in the diffusion prevention layer 22 is lower than an average concentration of the corrosion inhibitor in the corrosion prevention layer 21. The corrosion prevention layer 21 constitutes 50% to 90% of an entire volume of the overlay. In other words, the thickness of the corrosion prevention layer 21 is 50% to 90% of the thickness of the overlay because the corrosion prevention layer 21 and the diffusion prevention layer 22 both typically have a substantially uniform thickness. A difference between the average concentration of the corrosion inhibitor included in the diffusion prevention layer and the average concentration of the corrosion inhibitor included in the corrosion prevention layer may be very small, but is preferably not less than 1.0 mass %.

The corrosion inhibitor is an element having a higher oxygen affinity than Bi, that is, an element having a higher ionization tendency than Bi or having high corrosion resistance as a single element, in particular a metal element. When such an element forms an alloy, a solid solution or an intermetallic compound in Bi, the alloy, solid solution or intermetallic compound is preferentially combined with oxygen to prevent corrosion (oxidation) of Bi. The corrosion inhibitor is particularly preferably a metal element. The corrosion inhibitor is more preferably Sn, Cu, Zn, In, Sb or Ag, and may include one or more of these elements. The corrosion inhibitor still more preferably includes Sb as an essential element, and further includes at least one selected from Sn, Cu, Zn, In and Ag. Alternatively, the corrosion inhibitor may be Sb.

When a temperature is increased during operation of a device including a sliding member, such as an internal combustion engine including a sliding member, a corrosion inhibitor in Bi diffuses into a base alloy, and this reduces a concentration of the corrosion inhibitor, leading to lower corrosion resistance. The present inventors have focused on the fact that when a Bi layer includes a small amount of corrosion inhibitor, the corrosion inhibitor is less likely to diffuse into a base alloy. The present inventors have found that diffusion of a corrosion inhibitor in a Bi layer is prevented when a layer including a corrosion inhibitor at a low concentration is provided between the Bi layer and a base metal, and thus the present inventors have reached the present invention. That is, surprisingly, when a sliding member includes an intermediate Bi layer including a corrosion inhibitor at a low concentration between a base alloy and a surface Bi layer including a sufficient amount of corrosion inhibitor to prevent corrosion, it is possible to prevent diffusion of Bi from the surface Bi layer to the base alloy during operation of the device including the sliding member, such as an internal combustion engine including the sliding member.

Thus, in the present invention, the diffusion prevention layer 22 is provided between the bearing alloy layer 4 and the corrosion prevention layer 21, and the average concentration of the corrosion inhibitor in the diffusion prevention layer 22 is set to be lower than the average concentration of the corrosion inhibitor in the corrosion prevention layer 21. It has been confirmed that the effect of preventing diffusion of the corrosion inhibitor is achieved when the average concentration of the corrosion inhibitor in the diffusion prevention layer 22 is even slightly lower than the average concentration of the corrosion inhibitor in the corrosion prevention layer 21. However, the difference between the average concentration of the corrosion inhibitor in the diffusion prevention layer 22 and the average concentration of the corrosion inhibitor in the corrosion prevention layer 21 is preferably not less than 1.0 mass %. Furthermore, the corrosion prevention layer including a sufficient amount of corrosion inhibitor constitutes 50% to 90% of the entire volume of the overlay, thus allowing the overlay to have higher corrosion resistance. The diffusion prevention layer 22 also including the corrosion inhibitor maintains the corrosion resistance of the overlay as a whole.

The average concentration of the corrosion inhibitor in the corrosion prevention layer 21 is preferably 3.0 mass % to 20.0 mass %. When the average concentration of the corrosion inhibitor is not less than 3.0 mass %, the corrosion prevention layer located closer to the surface layer has high corrosion resistance. However, if the corrosion prevention layer 21 includes the corrosion inhibitor at an excessively high concentration, the corrosion inhibitor is more likely to move toward the bearing alloy layer through diffusion. Thus, the upper limit of the average concentration of the corrosion inhibitor is preferably 20 mass %.

When the average concentration of the corrosion inhibitor in the corrosion prevention layer 21 is not less than 3.0 mass % and the corrosion prevention layer 21 constitutes not less than 50% of the entire region of the overlay 2, it is possible to prevent corrosion of Bi. Furthermore, when the average concentration of the corrosion inhibitor in the corrosion prevention layer 21 is not more than 20 mass %, the corrosion prevention layer 21 constitutes not more than 90% of the entire region of the overlay 2, and the diffusion prevention layer 22 in which Bi is included as a main component and the average concentration of the corrosion inhibitor is lower than in the corrosion prevention layer 21 is added at an interface between the corrosion prevention layer 21 and the bearing alloy layer 4, it is possible to prevent a reduction in the concentration of the corrosion inhibitor due to diffusion of the corrosion inhibitor in the Bi alloy of the corrosion prevention layer 21 located on the sliding surface, thereby ensuring corrosion resistance.

The average concentration of the corrosion inhibitor included in the diffusion prevention layer 22 is preferably 1.0 mass % to 8.0 mass %. An average concentration of not more than 8.0 mass % is preferable to obtain the effect of preventing a reduction in the concentration of Bi due to diffusion of Bi into the bearing alloy layer 4. On the other hand, the lower limit of the average concentration is set to 1.0 mass % to ensure that the diffusion prevention layer 22 has corrosion resistance, thus allowing the overlay as a whole to have higher corrosion resistance.

A thickness of the overlay is not particularly limited, but is preferably 5 μm to 20 μm, and particularly preferably 5 μm to 15 μm. For example, when the thickness of the overlay is 10 μm, $t_{21}$: $t_{22}$ is in the range of 5 μm:5 μm to 9 μm:1 μm, where $t_{21}$ represents a thickness of the corrosion prevention layer 21 and $t_{22}$ represents a thickness of the diffusion prevention layer 22.

The overlay 2 (the corrosion prevention layer 21 and/or the diffusion prevention layer 22) may optionally further include, for example, 0.1 to 10 volume % of hard particles composed of one or more selected from $Al_2O_3$, $SiO_2$, AlN, $Mo_2C$, WC, $Fe_2P$, and $Fe_3P$. Such hard particles are dispersed in a matrix to provide higher wear resistance. However, if the content of hard particles in the overlay is less than the lower limit value, the hard particles have an insufficient effect. If the content of hard particles in the overlay exceeds the upper limit value, the hard particles cause the overlay to become brittle.

The overlay 2 (the corrosion prevention layer 21 and/or the diffusion prevention layer 22) may optionally further include, for example, 0.1 to 10 volume % of solid lubricant composed of one or more selected from $MoS_2$, $WS_2$, graphite, and h-BN. Such a solid lubricant is dispersed in a matrix of the copper alloy 4 to provide higher lubricity. However, if the content of solid lubricant in the overlay is less than the lower limit value, the solid lubricant has an insufficient effect. If the content of solid lubricant included in the overlay exceeds the upper limit value, the solid lubricant causes the overlay to become brittle.

A material of the bearing alloy layer 4 is not particularly limited, and may be metal typically used as a bearing alloy, such as copper, aluminum, a copper alloy, or an aluminum alloy. The bearing alloy layer 4 may be produced by scattering a raw material powder on a substrate and sintering the raw material powder. Alternatively, the bearing alloy layer 4 may be produced by casting or using other production methods. The bearing alloy layer 4 may include hard particles, a solid lubricant, and/or a filler.

In the embodiment described above, the overlay 2 is composed of two layers, that is, the corrosion prevention layer 21 and the diffusion prevention layer 22. However, the diffusion prevention layer 22 may be composed of a plurality of layers. For example, the diffusion prevention layer 22 may be composed of two layers, and a second diffusion prevention layer, a first diffusion prevention layer, and a corrosion prevention layer 21 may be sequentially laminated on the bearing alloy layer 4. In such a case, $c_1 > c_{21} > c_{22}$ is satisfied, where $c_1$ represents the average concentration of the corrosion inhibitor in the corrosion prevention layer 21, $c_{21}$ represents the average concentration of the corrosion inhibitor in the first diffusion prevention layer, and $c_{22}$ represents the average concentration of the corrosion inhibitor in the second diffusion prevention layer. The same applies to the case where the diffusion prevention layer 22 is composed of three or more layers. In this case as well, the corrosion prevention layer constitutes 50% to 90% of the entire volume of the overlay, and the average concentration of the corrosion inhibitor in the corrosion prevention layer 21 and the average concentration of the corrosion inhibitor in the diffusion prevention layer 22 are preferably in the concentration range described above.

Figure 2:
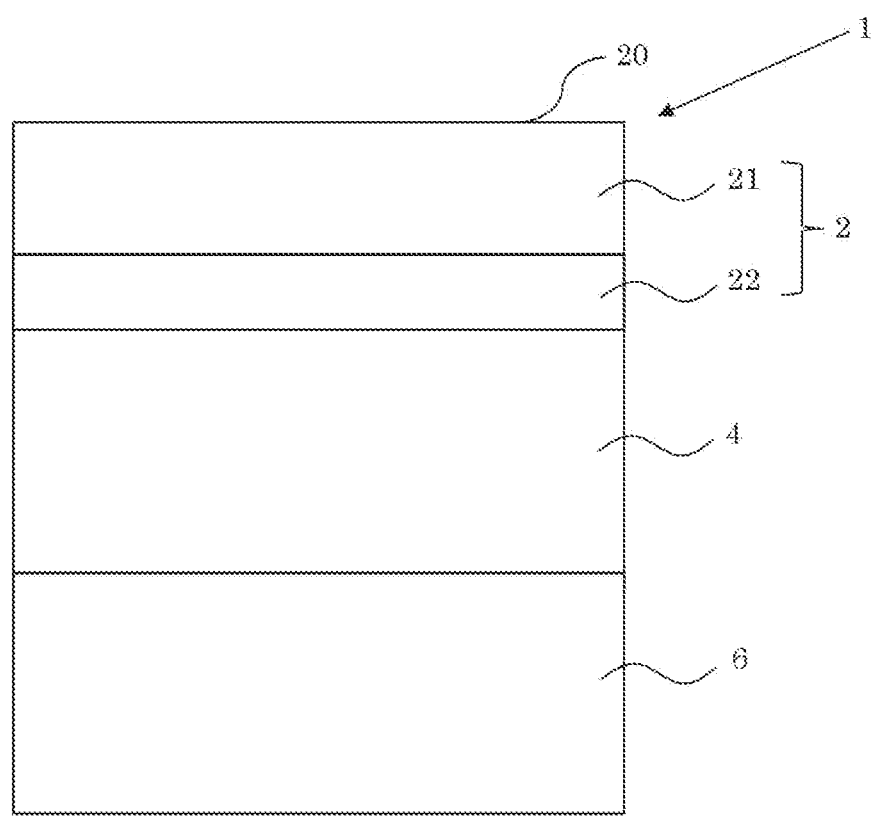
FIG. 2 is a schematic cross-sectional view of another embodiment of the sliding member according to the present invention.

FIG. 2 shows another embodiment of the sliding member according to the present invention. The sliding member shown in FIG. 2 differs from the sliding member shown in FIG. 1 in that the sliding member in FIG. 2 includes a back-metal layer that supports the bearing alloy layer. The overlay configuration and the bearing alloy layer are the same as those of the embodiment shown in FIG. 1.

A material of the back-metal layer is not particularly limited, and may be a metal plate made of an Fe alloy, Cu, a Cu alloy, or the like. The back-metal layer is preferably composed of a plate having a predetermined size and made of an iron-based material, for example, an Fe alloy such as hypoeutectoid steel, austenitic stainless steel, or ferrite stainless steel. A porous metal layer or an intermediate layer may be provided on a surface of the back-metal layer, specifically, on an interface between the back-metal layer and the bearing alloy layer, to achieve a higher bonding strength between the bearing alloy layer and the back-metal layer.

EXAMPLES

Samples 1 to 11 and samples 21 to 27 were produced in the following manner. A bearing alloy layer made of a copper alloy was lined on a steel plate constituting a back-metal layer to form a bimetal. The bimetal was processed into a semi-cylindrical shape to form a half bearing. Then, an overlay (a diffusion prevention layer and a corrosion prevention layer) obtained by adding a corrosion inhibitor to Bi was adhered to the bearing alloy layer of the half bearing by plating processing. The overlay had a total thickness of 10 μm. Table 1 shows a composition and a thickness of the diffusion prevention layer and the corrosion prevention layer. The samples 1 to 8 and 21 to 23 included Sb as a corrosion inhibitor, and the samples 9 and 24 included a combination of Sb and Cu as a corrosion inhibitor. In the sample 10, the corrosion prevention layer included a combination of Sb and Cu as a corrosion inhibitor, and the diffusion prevention layer included a combination of Ni and Zn as a corrosion inhibitor. In the sample 11, the corrosion prevention layer included a combination of Sb and In as a corrosion inhibitor, and the diffusion prevention layer included a combination of Co and Sb as a corrosion inhibitor. In the sample 25, the overlay was a single layer made of Bi and 3.0% of Sb, and in the sample 26, the overlay was a single layer made of Bi. In the sample 27, the corrosion prevention layer was made of Bi and 3.0% of Sb, and the diffusion prevention layer was made of Ag and 10% of Sn (including no Bi). The thicknesses of the corrosion prevention layer and the diffusion prevention layer in the overlay were determined by observing an EPMA element mapping image of a cross section of the samples.

The plating processing may be performed under typical plating conditions. For example, in the sample 1, the diffusion prevention layer was plated at a current density of 1.0 to 5.0 A/dm² and a plating bath temperature of 20 to 40° C. using a plating solution obtained by adding approximately 3 mass % of an Sb solution to a Bi plating solution (e.g., 10 to 70 g/l of bismuth oxide, 30 to 150 ml/l of methanesulfonic acid, and 20 to 60 ml/l of additive). The corrosion prevention layer was plated at a current density of 1.0 to 5.0 A/dm² and a plating bath temperature of 20 to 40° C. using a plating solution obtained by adding 11 mass % of an Sb solution to the above Bi plating solution. For the other samples, the plating conditions were varied, for example, in terms of the concentration or type of additive (except for plating using Ag and 10% of Sn).

These samples were subjected to an oil immersion test and evaluated for corrosion resistance. In the oil immersion test, a lubrication oil equivalent to 10 W-30 was heated to a temperature of 130° C., and the samples were immersed in the lubrication oil for 300 hours. Then, a cross section of the samples was observed using an optical microscope, and a corrosion ratio of the overlay layer was measured. Furthermore, an average concentration of the corrosion inhibitor in the corrosion prevention layer after the immersion test was measured from an EPMA element mapping image of the cross section. Table 1 shows the corrosion ratio of the overlay layer and the average concentration of the corrosion inhibitor in the corrosion prevention layer after the immersion test obtained by measurement.

In the samples 23 and 24 as well, the average concentration of the corrosion inhibitor in the corrosion prevention layer was reduced after the immersion test, and the corrosion ratio of the overlay was high. In these samples, presumably,

TABLE 1

Table: Results of oil immersion test

| Sample | Corrosion prevention layer Thickness (μm) | Corrosion prevention layer Corrosion inhibitor and average concentration (mass %) | Diffusion prevention layer Thickness (μm) | Diffusion prevention layer Corrosion inhibitor and average concentration (mass %) | Corrosion ratio (%) of overlay layer | Corrosion inhibitor in corrosion prevention layer and average concentration (mass %) after immersion test | |
|---|---|---|---|---|---|---|---|
| Sample 1 | 5.0 | Sb 2.0 | 5.0 | Sb 0.5 | 15.5 | Sb 2.0 (unchanged) | Examples |
| Sample 2 | 9.0 | Sb 22.0 | 1.0 | Sb 0.5 | 12.3 | Sb 22.0 (unchanged) | |
| Sample 3 | 8.0 | Sb 3.0 | 2.0 | Sb 0.5 | 8.0 | Sb 3.0 (unchanged) | |
| Sample 4 | 8.0 | Sb 20.0 | 2.0 | Sb 9.0 | 8.5 | Sb 20.0 (unchanged) | |
| Sample 5 | 8.0 | Sb 11.0 | 2.0 | Sb 9.0 | 8.2 | Sb 11.0 (unchanged) | |
| Sample 6 | 8.0 | Sb 8.0 | 2.0 | Sb 1.0 | 2.5 | Sb 8.0 (unchanged) | |
| Sample 7 | 8.0 | Sb 10.0 | 2.0 | Sb 8.0 | 4.0 | Sb 10.0 (unchanged) | |
| Sample 8 | 8.0 | Sb 8.0 | 2,0 | Sb 3.0 | 2.5 | Sb 8.0 (unchanged) | |
| Sample 9 | 8.0 | (Sb 9.5 + Cu 0.5) = 10.0 | 2.0 | (Sb 4.1 + Cu 1.0) = 5.1 | 3.0 | (Sb 9.5 + Cu 0.5) = 10.0 (unchanged) | |
| Sample 10 | 8.0 | (Sb 15.5 + Cu 1.0) = 16.5 | 2.0 | (Ni 1.0 + Zn 2.5) = 3.5 | 5.5 | (Sb 15.5 + Cu 1.0) = 16.5 (unchanged) | |
| Sample 11 | 8.0 | (Sb 17.0 + In 2.0) = 19.0 | 2.0 | (Co 1.1 + Sb 2.0) = 3.1 | 4.0 | (Sb 17.0 + In 2.0) = 19.0 (unchanged) | |
| Sample 21 | 4.0 | Sb 5.0 | 6.0 | Sb 2.0 | 24.0 | Sb 4.0 | Comparative Examples |
| Sample 22 | 9.5 | Sb 2.5 | 0.5 | Sb 1.1 | 30.5 | Sb 1.5 | |
| Sample 23 | 8.0 | Sb 5.0 | 2.0 | Sb 8.0 | 32.0 | Sb 2.0 | |
| Sample 24 | 8.0 | (Sb 1.5 + Cu 0.5) = 2.0 | 2.0 | (Sb 2.5 + Cu 0.5) = 3.0 | 31.0 | (Sb 0.5 + Cu 0.5) = 1.0 | |
| Sample 25 | 10.0 | Sb 3.0 (single-layer plating) | none | — | 31.1 | — | |
| Sample 26 | 10.0 | 0 (Bi 100%) | none | — | 40.1 | — | |
| Sample 27 | 9.0 | Sb 3.0 | 1.0 | Ag—10Sn (including no Bi) | 16.0 | — | |

The results in Table 1 showed that in the samples 1 to 11 satisfying the requirements of the present invention, the thickness (i.e., volume) of the corrosion prevention layer was 50% to 90% of the entire thickness (i.e., volume) of the overlay, and the average concentration of the corrosion inhibitor included in the diffusion prevention layer was lower than the average concentration of the corrosion inhibitor included in the corrosion prevention layer; thus, the average concentration of the corrosion inhibitor in the corrosion prevention layer after the immersion test was unchanged from before the immersion test, maintaining high corrosion resistance.

On the other hand, in the sample 21, the average concentration of the corrosion inhibitor in the corrosion prevention layer was reduced after the immersion test, and the corrosion ratio of the overlay was high. In this sample, presumably, although the average concentration of the corrosion inhibitor included in the diffusion prevention layer was lower than the average concentration of the corrosion inhibitor included in the corrosion prevention layer, the thickness (i.e., volume) of the corrosion prevention layer was 40% of the entire thickness (i.e., volume) of the overlay; thus, the corrosion prevention layer had insufficient corrosion resistance.

In the sample 22 as well, the average concentration of the corrosion inhibitor in the corrosion prevention layer was reduced after the immersion test, and the corrosion ratio of the overlay was high. In this sample, presumably, although the average concentration of the corrosion inhibitor included in the diffusion prevention layer was lower than the average concentration of the corrosion inhibitor included in the corrosion prevention layer, the thickness (i.e., volume) of the corrosion prevention layer was 95% of the entire thickness (i.e., volume) of the overlay; thus, the effect of the diffusion prevention layer was insufficient.

although the thickness (i.e., volume) of the corrosion prevention layer was 80% of the entire thickness (i.e., volume) of the overlay, the average concentration of the corrosion inhibitor included in the diffusion prevention layer was higher than the average concentration of the corrosion inhibitor included in the corrosion prevention layer; thus, the effect of the diffusion prevention layer was not achieved.

The samples 25 and 26 included no diffusion prevention layer; thus, the corrosion ratio of the overlay was high. The sample 25, in which the overlay was made of Bi and Sb, had higher corrosion resistance to some extent than the sample 26, in which the overlay was made of only Bi. However, the sample 25 had a much higher corrosion ratio of the overlay than the samples 1 to 11.

The sample 27 was based on the technique disclosed in JP 2020-46073A. The Ag—Sn alloy used as the intermediate layer had insufficient corrosion resistance; thus, the sample 27 had a much higher corrosion ratio of the overlay than the samples 1 to 11.

The sliding member of the present invention is applicable to a sliding member, particularly a sliding bearing, used in a bearing portion of internal combustion engines and a bearing device of automatic transmissions. However, the application of the sliding member of the present invention is not limited to this. The sliding member of the present invention is also applicable to a sliding member of a bearing device of industrial machines or other machines.

The invention claimed is:
1. A sliding member comprising
a bearing alloy layer, and
an overlay on the bearing alloy layer,
wherein the overlay comprises
a diffusion prevention layer on the bearing alloy layer, and a corrosion prevention layer on the diffusion prevention layer, the corrosion prevention layer having a sliding surface, wherein the corrosion prevention layer constitutes 50% to 90% of an entire volume of the overlay, wherein the corrosion prevention layer and the diffusion prevention layer each comprise: a corrosion inhibitor; and the balance of Bi and inevitable impurities, the corrosion inhibitor being one or more elements that have a higher oxygen affinity than Bi and that form an alloy, a solid solution or an intermetallic compound with Bi, wherein the corrosion inhibitor comprises at least one element selected from Cu, Zn, In and Sb, and wherein an average concentration of the corrosion inhibitor in the diffusion prevention layer is lower than an average concentration of the corrosion inhibitor in the corrosion prevention layer.

2. The sliding member according to claim 1, wherein a difference between the average concentration of the corrosion inhibitor in the diffusion prevention layer and the average concentration of the corrosion inhibitor in the corrosion prevention layer is not less than 1.0 mass %.

3. The sliding member according to claim 1, wherein the average concentration of the corrosion inhibitor in the corrosion prevention layer is 3.0 mass % to 20.0 mass %.

4. The sliding member according to claim 1, wherein the average concentration of the corrosion inhibitor in the diffusion prevention layer is 1.0 mass % to 8.0 mass %.

5. The sliding member according to claim 1, wherein the corrosion inhibitor is a combination of Sb and at least one selected from Sn, Cu, Zn, In and Ag.

6. The sliding member according to claim 1, wherein the corrosion inhibitor is Sb.

7. The sliding member according to claim 1, wherein the overlay further comprises hard particles.

8. The sliding member according to claim 1, wherein the overlay further comprises a lubricant.

9. The sliding member according to claim 1, further comprising a back-metal layer,
wherein the bearing alloy layer is located on the back-metal layer.

10. The sliding member according to claim 1, wherein the sliding member is a sliding bearing.

11. A bearing device comprising the sliding member according to claim 1.

12. An internal combustion engine comprising the bearing device according to claim 11.

* * * * *